United States Patent [19]

McKechnie

[11] 4,068,643

[45] Jan. 17, 1978

[54] MULTIPLE SPARK IGNITION SYSTEM

[76] Inventor: Ian C. McKechnie, 252-27 E. Tropicana, Las Vegas, Nev. 89109

[21] Appl. No.: 690,890

[22] Filed: May 28, 1976

[51] Int. Cl.² .............................................. F02P 1/00
[52] U.S. Cl. ........................................... 123/148 CA
[58] Field of Search .................... 123/148 E, 148 CA; 315/209 CD, 209 T

[56]  References Cited
U.S. PATENT DOCUMENTS

| 3,277,875 | 10/1966 | Miki | 123/148 E |
| 3,311,783 | 3/1967 | Gibbs et al. | 123/148 E |
| 3,322,107 | 5/1967 | Mieras et al. | 315/209 T |
| 3,390,688 | 7/1968 | Hufton | 315/209 T |
| 3,831,570 | 8/1974 | Compton et al. | 123/148 E |
| 3,919,993 | 11/1975 | Neuman | 123/148 E |

Primary Examiner—Samuel Feinberg

[57] ABSTRACT

A solid state ignition system, providing multiple sparks for each power stroke, over the entire speed range of an associated engine, together with pre-selective solid state spark advance circuitry.

13 Claims, 15 Drawing Figures

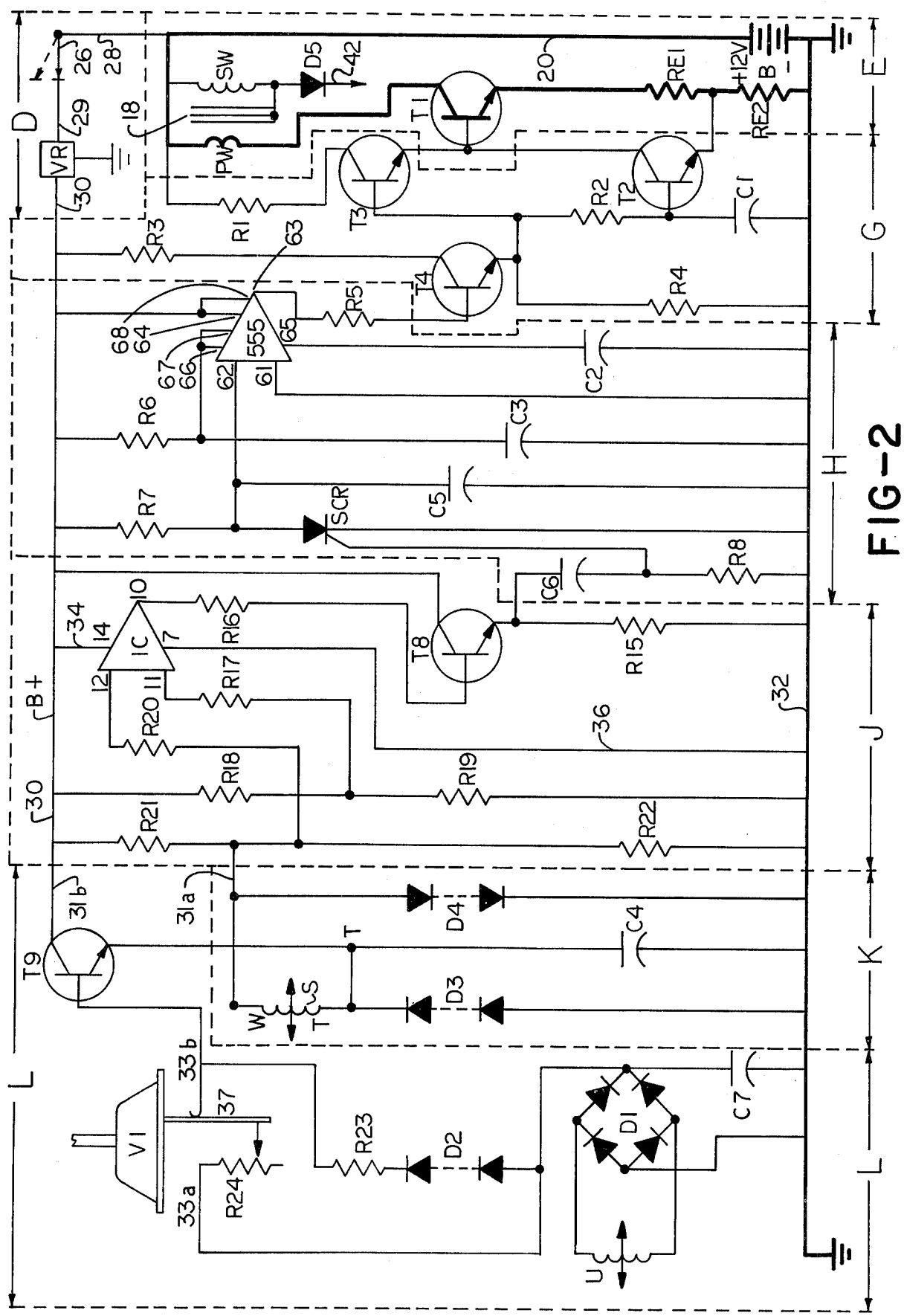

MULTIPLE SPARK IGNITION SYSTEM

SUMMARY BACKGROUND OF THE INVENTION

The present invention relates to solid state ignition systems and more particularly to an inductive ignition system providing a multiple of sparks for each power stroke, over the entire speed range of an associated engine.

The advantage of solid state capacitor discharge and inductive ignition systems are known. Both systems, however, require additional mechanical devices to obtain the spark advance desired for efficient operation of the engine throughout the various speed and load conditions. In addition, inductive systems currently in use, require that current flow to the primary of the ignition coil be re-established as rapidly as possible after sparking throughout the speed range, in order to insure that adequate magnetic flux is present in the coil core, particularly at high speeds, for the subsequent spark.

In the present invention, novel circuitry is provided in which the primary current flow is not re-established until just before the next series of sparks occur, with consequent saving of electrical energy, particularly at the lower speeds.

In addition, the present invention provides a first spark plus an additional series of subsequent sparks in rapid succession, during a pre-selected time interval, for each power stroke. This series of rapid sparks insures that combustion of the cylinder mixture will occur, even with poor mixtures which may exist under cold, hot, flooded or idle conditions. The cylinder mixture, which is in a continuous state of turbulance, and not homogenuous prior to ignition, will be ignited by a succeeding spark, should the initial spark occur at the instant when a non-combustible mixture is in the vicinity of the spark plug gap.

The present invention also provides for obtaining the desired spark advance under speed and load variations, electronically.

With the circuitry of the present invention, the relatively large current supplied to the ignition coil, is fed directy from the battery, and only the relatively much lower control current is carried thru the ignition switch.

In the present invention, the overall inductance of the ignition coil has been reduced to a minimum in order to obtain the maximum energy storage in the magnetic core of the coil in the shortest possible time by; (1) a relatively low number of primary turns of large wire, (2) a ferrite core material having high flux storage capability, together with a minimum of residual flux when the magnetizing force is removed.

SUMMARY OF THE INVENTION

Therefore, it is an object of the present invention to provide novel circuitry of the above described type for providing a series of sparks, the first spark to occur at a preselected time relative to the piston position in the cylinder, under all variations of load and speed.

Another object of this invention is to provide an inductive ignition system which draws current from the battery only a short interval just before and during the period of multiple sparking, resulting in a reduction of energy consumption, particularly at lower speeds Another object of the invention is to provide an inductive ignition system in which only a relatively small control current is carried by the ignition switch.

Another object of the invention is to provide an ignition coil with greatly reduced impedance characteristics which enhance the capability of the system to a reduction in the consumption of energy, while providing multiple sparking over the speed range.

It is still another general object to provide a new and improved electronic ignition circuit.

Other objects, features and advantages of the present invention will become apparent from the subsequent description and the appended claims, taken in conjunction with the accompanying drawings, in which;

FIG. 2 is a circuit diagram of the ignition system exemplifying features of the present invention;

A. GENERAL DESCRIPTION

Figure 1:
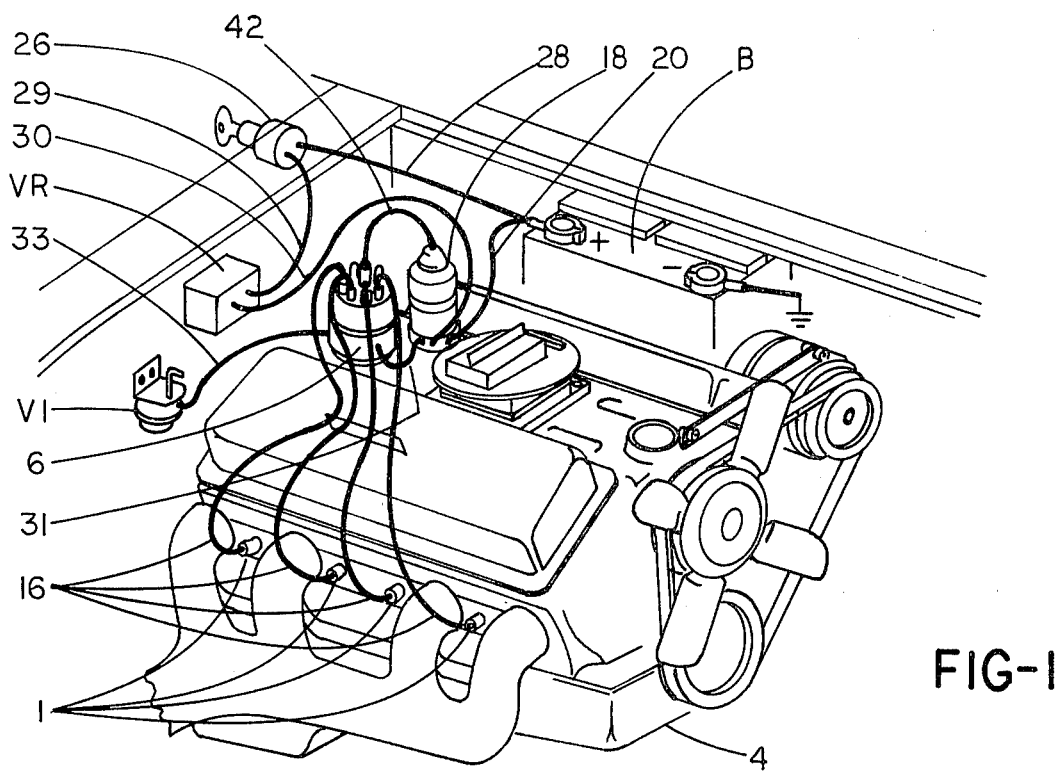
FIG. 1 is a pictorial view of an automotive engine and the electronic ignition system of the present invention.

Looking now at FIG. 1, an automotive engine 4 is shown having a plurality of cylinders, each with its spark plug 1. Each plug 1 is electrically connected to the cap of a distributor 6, via high tension Cables 16. The distributor 6 can be a modification of a conventional design, i.e. having a housing, drive shaft and cap, but modified (in a manner to be described) to replace the conventional points and condenser with a pick-up coil and a speed sensing coil. The high voltage output from the secondary of ignition coil 18 is electrically connected to the center terminal of the distributor cap via high tension cable 42, in the conventional manner, for selective distribution to the proper plug 1.

Conductor 20 electrically connects the plus terminal of battery B, directly to one end of the primary winding of ignition coil 18, and is of sufficient cross section to carry a relatively large current. Conductor 28 electrically connects the plus terminal of battery B to ignition switch 26. Conductor 29, in turn, connects the ignition switch 26 to the voltage regulator VR and thence connects the regulated output B+ by conductor 30 to the control circuit, also located in the housing of ignition coil 18. Conductors 28, 29 and 30 carry only relatively small current and are of small cross section.

A two conductor cable 31a and 31b of relatively small cross section, is connected between the control circuit, located in the base of ignition coil 18 and the distributor 6. Another two conductor cable 33a and 33b, of small cross section is connected between vacuum unit VI and distributor 6. The function of these connections will be explained later.

B. CIRCUIT DESCRIPTION

A schematic diagram of the entire electrical circuit is shown in FIG. 2 with the exception of distribution of the high voltage pulses generated to the proper spark plug, which is accomplished in the conventional manner through the distributor cap, rotor and associated high voltage wiring.

For clarity of explanation, the circuit has been subdivided as follows:

Portion D, which supplies the relatively small amount of current required from the 12 volt storage battery B, thru the ignition switch 26 and voltage regulator VR to the control circuits as shown in circuit portions G, H, J, K and L, and as noted in the following descriptions.

Portion E which carries the large peak current required to magnetize the core of ignition coil 18, (shown in heavy lines), consisting of battery B, ignition coil primary winding PW, switching transistor T1 (normally off), resistors RE1 and RE2, and ground connection 32 which is the metal framework of the vehicle to which the negative terminal of battery B is connected. In addition, the high voltage winding SW of ignition coil 18 and diode D5. All preferably located under oil, in the ignition coil housing.

Portion G that directly controls the "on" or "off" state of transistor T1, consisting of resistor R1 and transistors T2 and T3 having their current supplied direct from battery B, together with resistors R2, R3, R4 and transistor T4, having their current supplied from the voltage regulator VR via the B+ conductor 30. All also located preferably under oil, in the ignition coil housing as will be described later.

Portion H that limits the duration of the "on" signals that are applied to the preceeding portions E and G of the circuit. This portion is sometimes called a "one shot multivibrator", and "monostable multivibrator" or a "timer" in the trade. This portion consists of integrated circuit type 555 "timer", resistors R5, R6, R7 and R8, capacitors C2, C3, C5 and C6 and silicon controlled rectifier SCR., all preferably located in the ignition coil housing in a separate dry chamber.

Portion J which is an amplifier that amplies a small positive voltage input, to deliver an output voltage of essentially supply voltage magnitide to the "timer" of portion H, consisting of operational amplifier IC in integrated circuit form, and resistors R15, R16, R17, R18, R19, R20, R21, R22 and transistor T8, also preferably located in the ignition coil housing along with portion H.

Portion K that produces electrical pulses in relation to the piston location in the cylinder, the magnitude of which are a function of the speed of rotation of the engine 4. The pulses are further modified in relation to speed of rotation and other factors, as will be described later, and supply the input to the amplifier portion J. The components are pick-up coil S, diodes D3 and D4, and capacitor C4, all located in the distributor housing.

Portion L that provides further modification of the pulses generated in portion K in relation to engine speed and vacuum. Components, pickup coil U, diodes D1 and D2, capacitor C7, resistor R23 and transistor T9 are located in the distributor housing. Resistor R24 and vacuum unit V2 are located separately.

Refer now to FIG. 2, portion D of the circuit. Conductor 28 connects the positive terminal of battery B to the input terminal of voltage regulator VR when ignition switch 26 is in the closed position as shown. Voltage regulator VR is a commercially available integrated circuit of type #7808 or equivalent, and maintains the voltage at its output terminal, connected to conductor 30 at 8.0 volts within close limits, thru an input voltage range of 8.0 to 15.0 volts. At input voltages less than 8.0 volts it delivers input at its output terminal. Thus, a constant 8.0 volt supply is maintained for all components connected, as shown, to conductor 30, except under extreme cold cranking conditions, when the voltage from the battery B may be less than 8.0 volts.

Refer now to FIG. 2, portion J of the circuit. A commercially available operational amplifier, op-amp, of Motorola type MC 3401 or National Semiconductor LM 3900, or equal, IC is connected to conductor 30 by conductor 34 to its positive supply terminal 14. Conductor 36 connects its negative supply terminal 7, to ground conductor 32, thence to the negative terminal of battery B.

Op-amp IC also has two input terminals, 11 and 12 and an output terminal 10. Its characteristics, which are well known in the art, result in the voltage from the output terminal 10 increasing from zero, to almost supply voltage, relative to ground, when the positive voltage applied to terminal 12 exceeds the positive voltage at its terminal 11.

Now note the voltage divider R18 (1 megohm) and R19 (511 kilohm), together with current limiting resistor R17 (511 kilohm) connected to IC terminal 11, and voltage divider R21 (1.24 megohm) and R22 (660 Kilohm) together with current limiting resistor R20 (511 kilohm) connected to IC terminal 12. These voltage dividers are so selected that the voltage at the junction of divider R18 and R19 of terminal 11 is about 1.8 volts, whereas the voltage at the junction of divider R21 and R22 of terminal 12 is about 1.7 volts, relative to ground and so the IC is normally in the "off" state and the voltage from its terminal 10 to ground is zero.

Transistor T8 (npn) is in the non-conducting or "off" state when the voltage at terminal 10 of op-amp IC is zero. Since its base, thru resistor R16 (5kilohm) is held at ground potential, however when sufficient voltage is applied to the junction of voltage divider R21, R22 to place IC in the "on" state, this raises the voltage at the base of transistor T8, turning it "on" and resulting in current flow thru T8 to resistor R15 (5 kilohm) and ground. Now B+ voltage will be present at the T8 emitter junction with R15.

Now refer to FIG. 2, portion H of the circuit. This portion limits the time its output will be in the "on" state, regardless of the time it receives an input voltage. When transistor T8 of the preceeding portion turns "on", current flows momentarily into capacitor C6 (0.0062 mfd) and then thru resistor R8 (10 kilohm) to ground, charging C6 in a very short time which produces a short positive pulse at the junction of C6 and R8, which junction is connected to the gate of SCR and causing SCR to turn "on". When SCR turns "on" it discharges capacitor C5 (0.024 mfd), which was formerly charged to B+ voltage thru resistor R7 (10 kilohm). Thus a very short negative going pulse is delivered to terminal 62 of "timer" 555.

"Timer" 555 has its positive supply terminals 64 & 68 connected to B+, while its negative supply terminal 61 is connected to ground. Its control voltage terminal 65 is also connected to ground thru C2 (0.01 mfd). Resistor R6 (14.7 kilohm) and capacitor C3 (0.1 mfd) determine the time interval that approximately B+ voltage will be present at terminal 63 when the negative going pulse is received at terminal 62. The values pre-selected for R6 and C3 produce a positive voltage at terminal 63 for 1.5 milliseconds regardless of the time transistor T8 may be in the "on" state. Thus B+ voltage is delivered thru resistor R5 (5 kilohm) to the base of transistor T4 (npn) of the next circuit portion G for a constant interval of 1.5 milliseconds whenever op-amp IC is turned "on".

Refer now to FIG. 2, portions E and G of the circuit, which will be explained together. Transistor T1 (npn) is connected via conductor 20, ignition coil 18 primary winding PW from battery B positive terminal, to its collector. Then from T1 emitter, via resistors RE1 (0.0543 ohm) and RE2 (0.0163 ohm) and ground conductor 32 to the negative battery B terminal, at all times, so that the battery B voltage is always present between the collector and emitter of T1.

With no input at the base of transistor T1, no current can flow and T1 is in the "off" state. Its base is connected to ground conductor 32 via transistor T3 (npn) emitter, base and resistor R4 (5 kilohm).

Transistor T4 (npn) has its collector connected by R3 (100 ohm) to B+ and its emitter connected to ground thru R4 (5 kilohm) so when its base is made positive by action of "timer" 555, it turns "on", resulting in about B+ voltage at the junction of T4 emitter, R4, transistor T3 (npn) base and resistor R2 (105 ohm). This causes transistor T3 to turn "on", also starts current flowing into capacitor C1 (13 mfd) thru R2, starting to charge C1, which was formerly in the discharged state.

As transistor T3 turned "on", it connected the full battery positive voltage, thru R1 (11 ohm) to the base of transistor T1, thus turning T1 "on" and permitting current to flow from battery B positive terminal, via conductor 20, thru ignition coil 18 primary winding PW, thru T1, resistors RE1 and RE2 to ground conductor 32 and back to battery B negative terminal.

This current flow will increase exponentially, due to the inductance of the windings of ignition coil 18, however its sudden flow does not generate a voltage in the secondary winding SW of coil 18, the polarity of which is such that any current flow is blocked by diode D5. The current flow thru the primary winding PW of coil 18 as it increases, will eventually be limited by the ohmic resistance of the circuit to about 18 to 20 amperes.

Capacitor C1, as previously noted, is now being charged thru resistor R2. The base of transistor T2 (npn) is also connected to the junction of R2 and C1, while its emitter is connected to the junction of voltage divider RE1, RE2. The voltage at the base of T2, due to the charge being accumulated on C1, is rising faster than its emitter voltage, since the voltage drop across RE2 is a function of the current flow thru the ignition coil 18, primary winding PW, transistor T1, RE1 and RE2, which current flow levels off at the ohmic value of the circuit.

When the voltage at the base of transistor T2 exceeds the voltage at its emitter sufficiently, T2 will turn "on". This interval between the turn "on" of transistor T4 and the turn "on" is not constant, but varies from 0.8 to 0.54 milliseconds as the time between turn "on" and turn "off" of T4 is varied from 200 to 2.5 milliseconds. This variation is a result of the discharge rate of capacitor C1 when T4 is in the "off" state. When T4 is "off", T2 is also "off" and C1 will slowly discharge exponentially via the high resistance path of the base and emitter of T2 and resistor RE2 to ground in about 20 milliseconds.

This results in some partial charge always remaining on capacitor C1 if the turn "on" intervals of transistor T4 are less than 200 milliseconds. This remaining charge on C1, shortens the time required for the voltage at the base of transistor T2 to rise sufficient to cause T2 to turn "on" as the interval between successive turn "on" of T4 is progressively shortened, so that at distributor speeds of 200 RPM or higher, this interval varies from 0.6 to 0.54 as speed increases.

As transistor T2 turns "on", it connects the base of transistor T1 to ground thru resistor RE2, causing T1 to turn "off" in an extremely short time, stopping all current flow thru ignition coil 18 primary winding PW. The magnetic flux then present in the core of ignition coil 18 collapses, except for a residual amount, inducing a voltage in the secondary winding SW of up to 35 kilovolts, the polarity being such that diode D5 will conduct current flow, via conductor 42 to the cap and rotor of distributor 6 and the preselected spark plug 1, via conductors 16. This secondary voltage pulse results in a first spark.

If transistor T4 is maintained in the "on" state, transistor T2 will also remain in the "on" state for 0.04 milliseconds, then turn "off" as follows; when T2 turned "on", the emitters of both T2 and transistor T3, via T2, as well as the base of transistor T1 are connected to ground thru resistor RE2. Additional current now flows into the base of T3 from the collector of T4, lowering the voltage applied to resistor R2. Added current also flows into the base of T2 from capacitor C1. The combined added flow from C1, together with the reduction of the voltage applied to C1 thru R2, reduced the charge on C1 sufficient in 0.04 milliseconds to cause T2 to burn "off" again.

Current again flows from the collector of T4, thru R2 re-charging capacitor C1. C1 however had a partial charge remaining and as a result, only about 0.26 milliseconds is required to raise its voltage sufficient to again turn "on" transistor T2 and cause a second spark. Thus, a series of sparks will be generated, every succeeding 0.3 millisecond interval, until T4 turns "off". This interval of 0.3 milliseconds is adequate to permit saturation of the ignition coil 18 care for the second and succeeding sparks since there was residual flux remaining in the core after the first spark.

Summing up the action of circuit portions D, E, G, H and J follows:

When ignition switch 26 is closed, a constant voltage of 8.0 volts is connected to conductor 30 from battery B. Subsequently, a slight positive voltage applied to the junction of voltage divider R21, R22 will result in transistor T8 turning "on". In turn this will result in a negative going pulse being applied to terminal 62 of "timer" 555. "Timer" 555 will then cause transistor T4 to turn "on" for precisely 1.5 milliseconds. Turning "on" T4 causes transistor T1 to turn "on" thru the action of transistor T3. After an interval of from 0.8 to 0.6 milliseconds at distributor RPM less than 200 and from 0.6 to 0.54 milliseconds at higher speeds, T1 will turn "off" by action of transistor T2 and its RC connections. T1 will again turn "on" in 0.04 milliseconds and "off" again in 0.26 milliseconds later, which sequence will be repeated for a period of 1.5 milliseconds, thus producing 4 high voltage pulses from ignition coil secondary winding SW which result in four sparks at the preselected spark plug 1.

Figure 3:
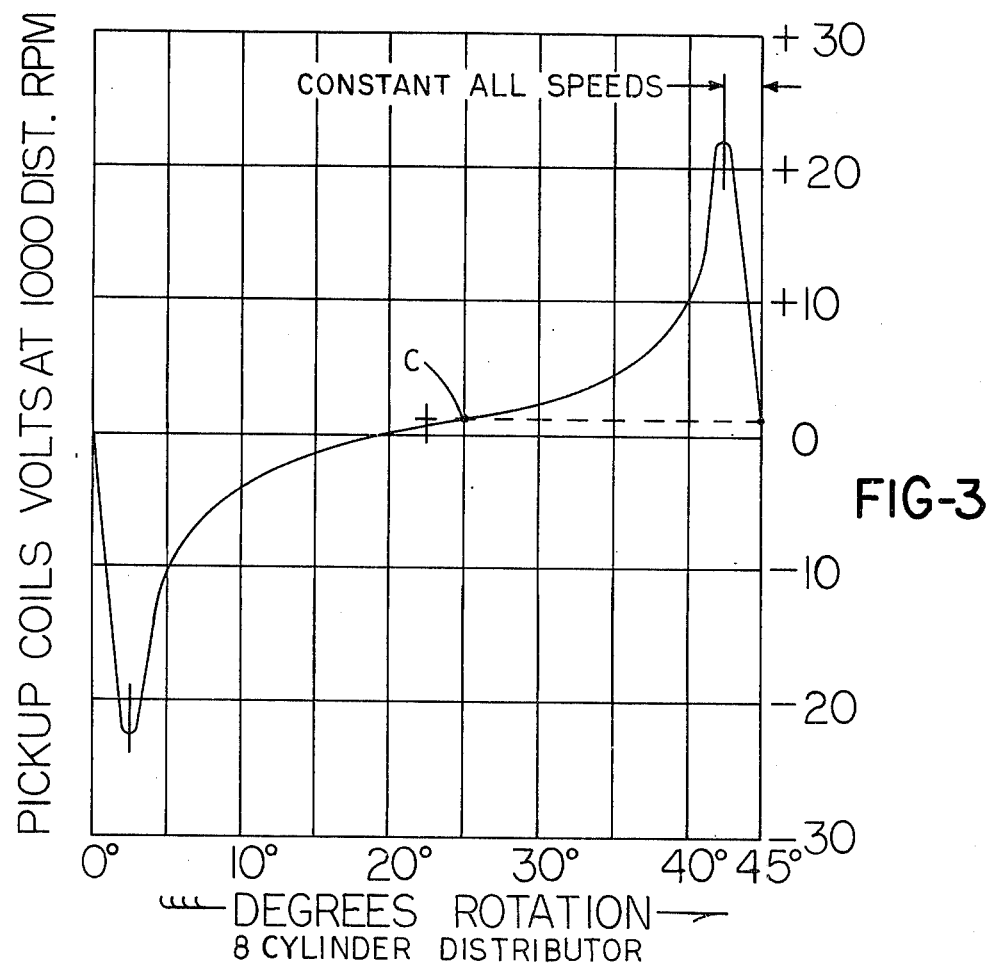
FIG. 3 shows graphically the voltage generated by the electrical pick-up of the system at 1000 distributor RPM.

Now refer to FIG. 2, circuit portions K. Pick-up coil S, located in the distributor 6, develops an alternating voltage between its W and T terminals in response to rotation of the distributor shaft as will be explained later. FIG. 3 shows the voltage developed at 1000 distributor RPM for 45° rotation of a eight cylinder distributor gear driven by the engine at ½ engine speed.

Figure 3A:
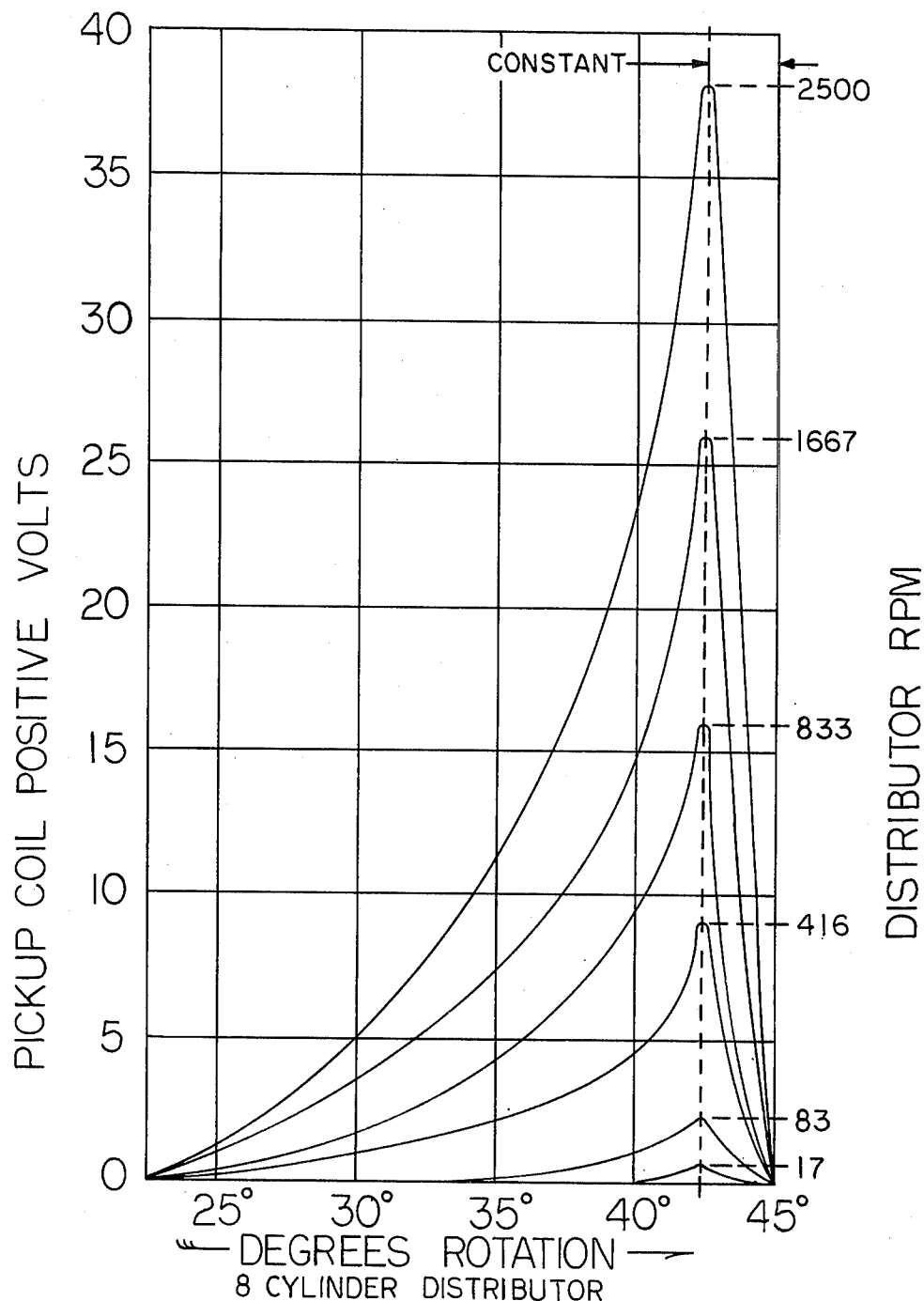
FIG. 3A shows graphically the positive half cycle only, of the voltage generated by the electrical pick-up of the system, at several speeds throughout the operating speed range.

FIG. 3A shows the positive voltage developed at several speeds from 17 to 2500 RPM for 22.5° rotation, the negative voltage being of equal magnitude during the other 22.5° of rotation. The magnitude of the voltage is a function of the speed of rotation as shown. The peak magnitude is reached, at all speeds, about 4.0° ahead of the 45° point, this 45° point being when a tooth on the rotating reluctor of the distributor 6, is in direct alignment with the magnetic pole of pick-up coil S as will be explained later.

Now refer to the diode D4 which is a series of five silicon diodes, each requiring a voltage of 0.8 to conduct an appreciable amount of current, or a total of about 4.0 volts for the series. At lower voltages, however, there is a current flow that increases exponentially with the magnitude of the applied voltage. This flow amounts of 0.5 microamps at 1.5 applied volts for the series of five diodes. This flow when ignition switch 26 is closed is such that the voltage at the junction of voltage divider R21, R22 is reduced from 1.7 to 1.5 volts normally and to 1.3 volts with added current flow, while the voltage at the junction of divider R18, R19 remains at 1.8 volts. As a result, a voltage increase of 0.3 to 0.5 volts applied to the junction of divider R21, R22 is now required to turn "on" op-amp IC.

As rotation of distributor 6 occurs, and on the portion of the 45° cycle when terminal W of pick-up coil S is positive, relative to terminal T or at point C as noted on the graph of FIG. 3, current will flow from terminal W, thru both diode D4 and resistor R22 to ground and back to terminal T of coil S, mostly thru capacitor C4 (10 mfd) initially. At about 10 RPM of distributor 6 this current flow will raise the voltage at the junction of voltage divider R21, R22 sufficient to cause op-amp IC to turn "on".

This current flow into and out of capacitor C4 leaves it charged with its T terminal more negative than its ground terminal. On the portion of the cylce when terminal W of pick-up coil S is negative relative to terminal T both diodes D4 and D3, which is a series of six silicon diodes, block current flow, so no current can flow at all until the peak negative voltage developed by coil S at terminal T, relative to terminal W, exceeds the positive voltage of resistor R22 of 1.5 volts. As speed increases a small amount of current will flow, as determined by the excess of this negative peak voltage over the 1.5 volts, divided by the resistance of R22 (660 kilohm) which flow is apreciably less than when terminal W is positive, thus causing a charge to accumulate on capacitor C4, as a function of the RPM of distributor 6, and causing terminal T of capacitor C4 to become more and more negative, relative to ground, as the speed of rotation increases.

Now the diode series D3, connected across capacitor C4, will also permit current flow from ground to the T terminal of capacitor C4 as the speed of rotation increases, particularly during the portion of the cycle when terminal W of coil S is positive. This diode D3, then acts as a limiter on the extent to which terminal T may go negative, with respect to ground, as the speed of rotation increases.

Figure 3B:
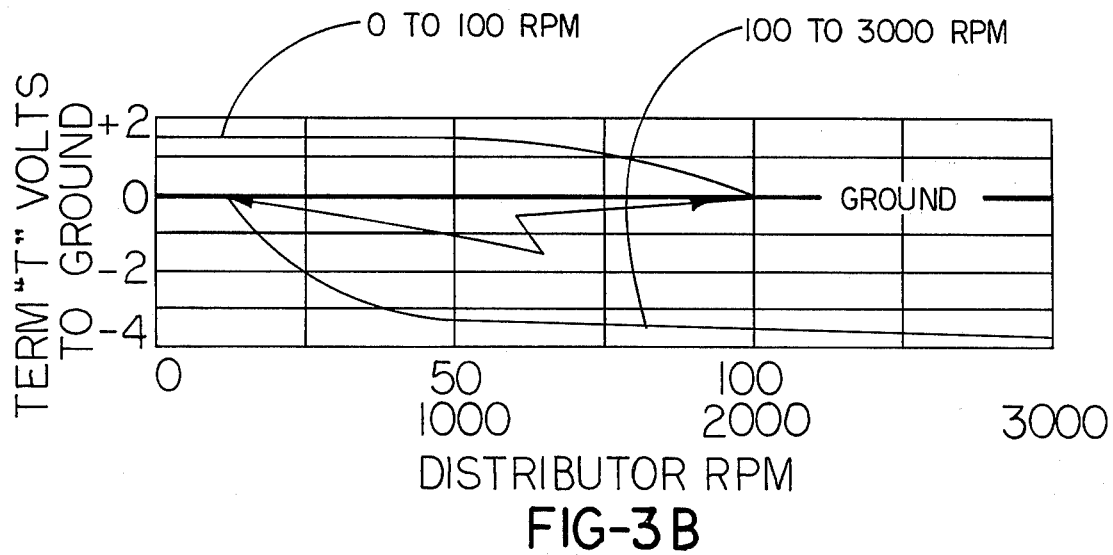
FIG. 3B shows graphically the shift, relative to ground, of the electrical pick-up voltage of the system, obtained by modification, thru the operating speed range, for zero spark advance.

FIG. 3B shows the resulting voltage between terminal T and ground thru the speed range of zero to 3000 distributor RPM.

This combination and the parameters of the components, pick-up coil S, capacitor C4, diodes D3 and D4 used, are pre-selected to result in providing a positive voltage to ground (0.3 - 0.5 volts) at the junction of voltage divider R21, R22, that result in op-amp IC turning "on" about 0.8 to 0.54 milliseconds prior to the 41° + or − 1.5°, rotation position of distributor 6, at all speeds from 10 RPM to 3000 RPM. Thus, transistor T1 is turned "off" at essentially a constant position of the rotation of distributor 6 each 45° over this speed range.

When transistor T1 turns "off", secondary winding SW develops an initial high voltage pulse, which is delivered to the pre-selected spark plug 1, followed in intervals of 0.3 milliseconds with succeeding high voltage pulses for 1.5 milliseconds.

Figure 3C:
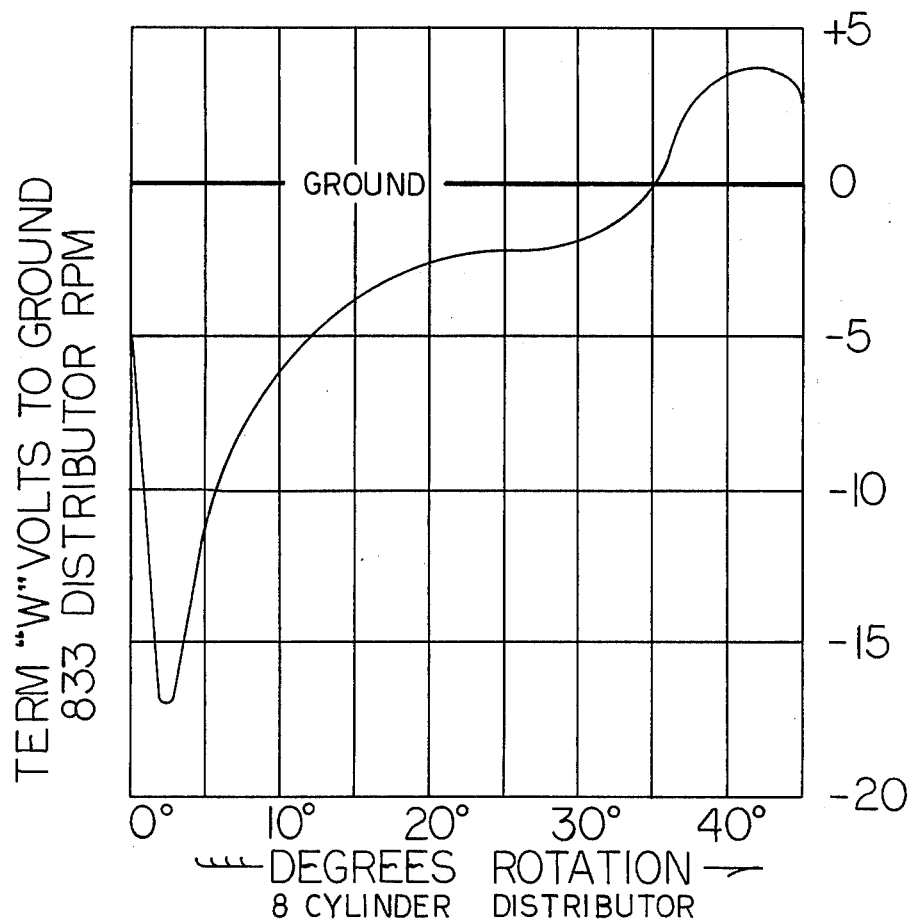
FIG. 3C shows graphically the electrical pick-up voltage, as modified, relative to ground, at 833 distributor RPM.

FIG. 3C shows graphically the entire voltage to ground developed at the junction of voltage divider R21, R22 (terminal W) at 833 RPM of distributor 6.

Figure 3D:
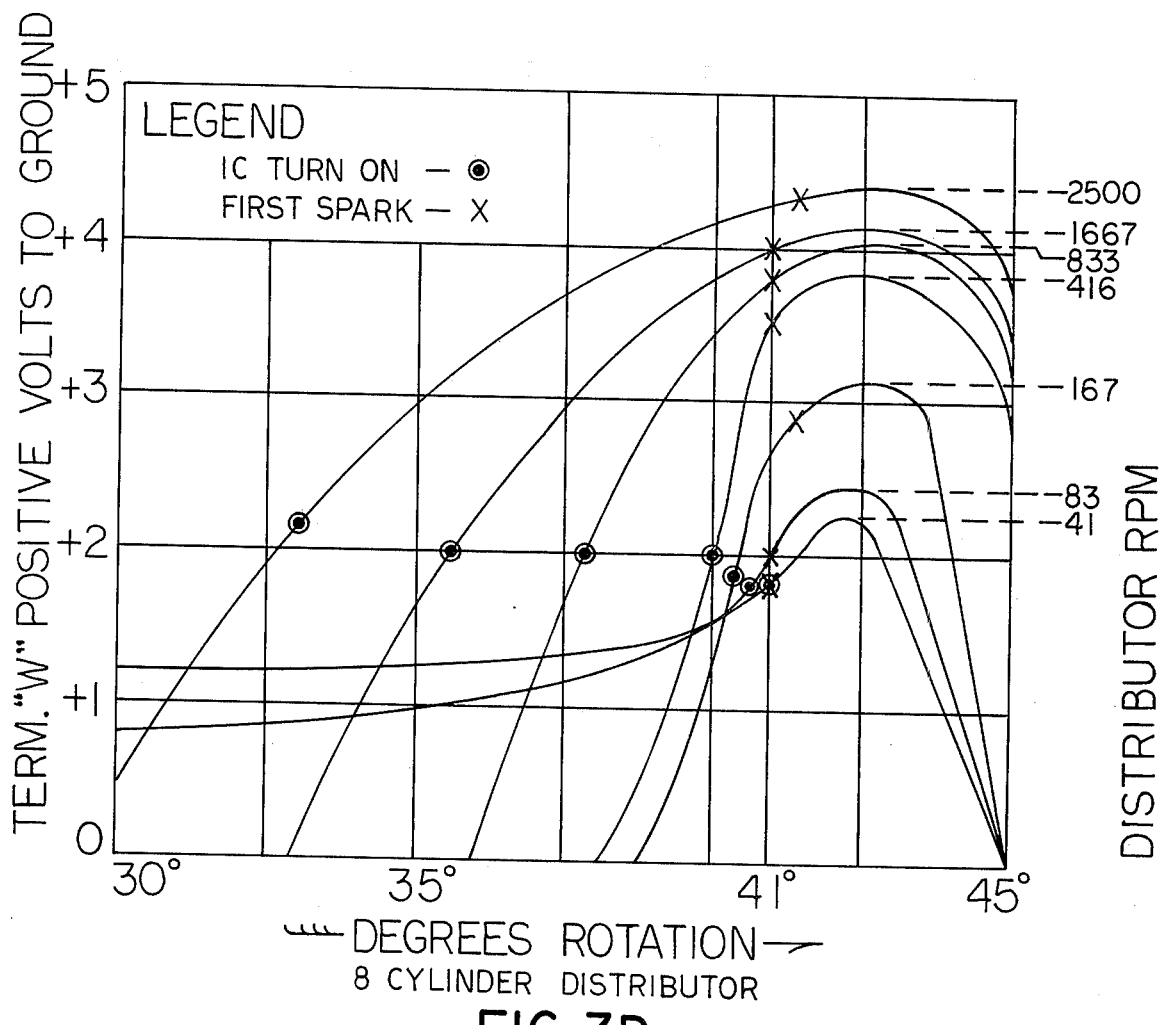
FIG. 3D shows graphically the positive portion only of the electrical pick-up voltage of the system, as modified, and at several speeds. The turn on point and sparking points, relative to distributor position for zero spark advance are also shown.

FIG. 3D shows graphically, the positive portion only, of the voltage to ground, developed at the junction of voltage divided R21, R22 (terminal W) for several speeds of rotation of distributor 6 from 41 to 2500 RPM, together with the turn "on" point of IC and the first spark point.

Figure 3E:
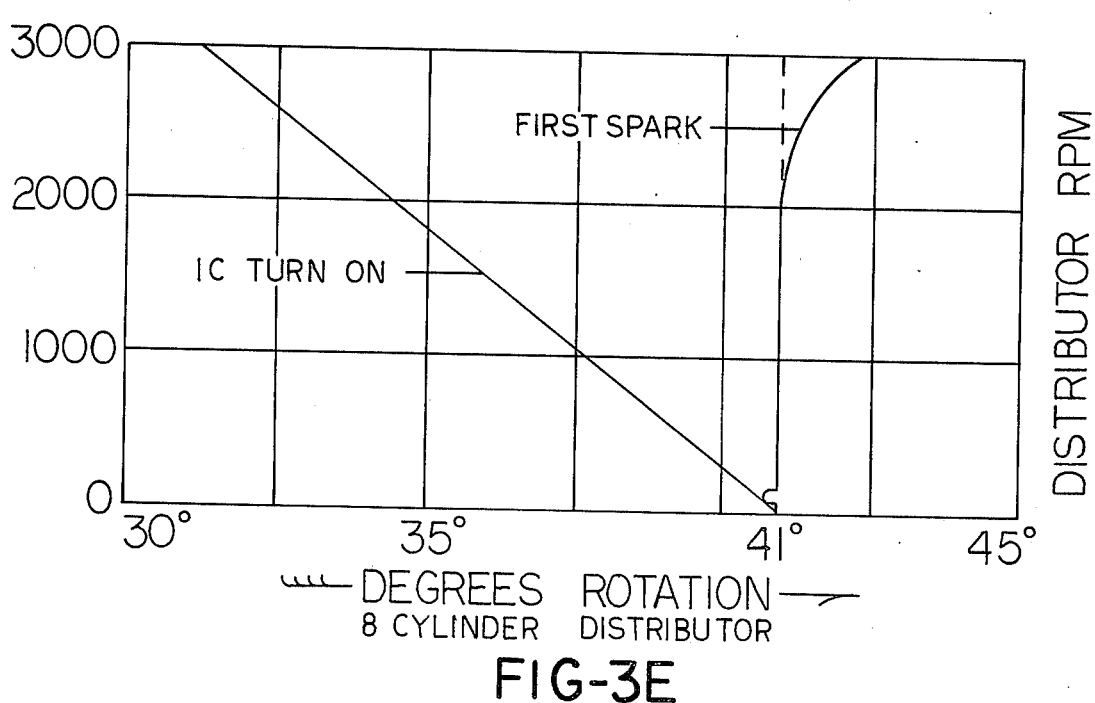
FIG. 3E shows graphically the point of system turn on and point of first spark relative to distributor position for zero spark advance, throughout the operating speed range.

FIG. 3E shows graphically, the point of turn "on" of op-amp IC, together with the point of first turn "off" of transistor T1, (first spark) in relation to the position of distributor rotation, thru the speed range from zero to 3000 RPM.

Summing up, circuit portion K provides sufficient positive voltage, to ground, at the junction of voltage divider R21, R22 approximately 0.6 milliseconds prior to a point 4°, + or − 1.5°, in advance of the 45° point of rotation of distributor 6. At this point, an initial high voltage pulse is delivered to a pre-selected spark plug 1, followed by succeeding high voltage pulses every 0.3 milliseconds, delivered to the same spark plug, for a duration of 1.5 milliseconds, thru the speed range of 10 to 3000 RPM.

Now refer to FIG. 2, portion L of the circuit. Pick-up coil U, also located in distributor 6, as will be described later, develops an alternating voltage similar to that shown graphically in FIG. 3. This voltage is rectified by bridge rectifier D1. The negative terminal of D1 is connected to ground. The + terminal of D1 will have a positive voltage to ground, the magnitude of which is a function of the speed of rotation of distributor 6, capacitor C7 (10 mfd) provides storage for this positive voltage.

The + terminal D1 is connected to diode series D2, in this particular case, 3 silicon diodes in series, thence to resistor R23 (25 kilohm) then to the base of transistor T9. The collector of T9 is connected to B+ while the emitter is connected to the T terminal of capacitor C4. Thus a positive voltage is supplied from B+, thru transistor T9 to the T terminal of capacitor C4, and T9 will turn "on" gradually, as a function of the speed of rotation of distributor 6. This gradual increase in the positive voltage applied to terminal T of C4, results in the positive threshold turn "on" voltage of op-amp IC, at the junction of voltage divider R21, R22, occuring earlier in the rotation of distributor 6 as the speed of rotation increases, This earlier turn "on" results in transistor T1 turning "off" earlier, and so "advances" the initial high voltage pulse from ignition coil 18, secondary winding SW, as a function of distributor 6 RPM.

Figure 3G:
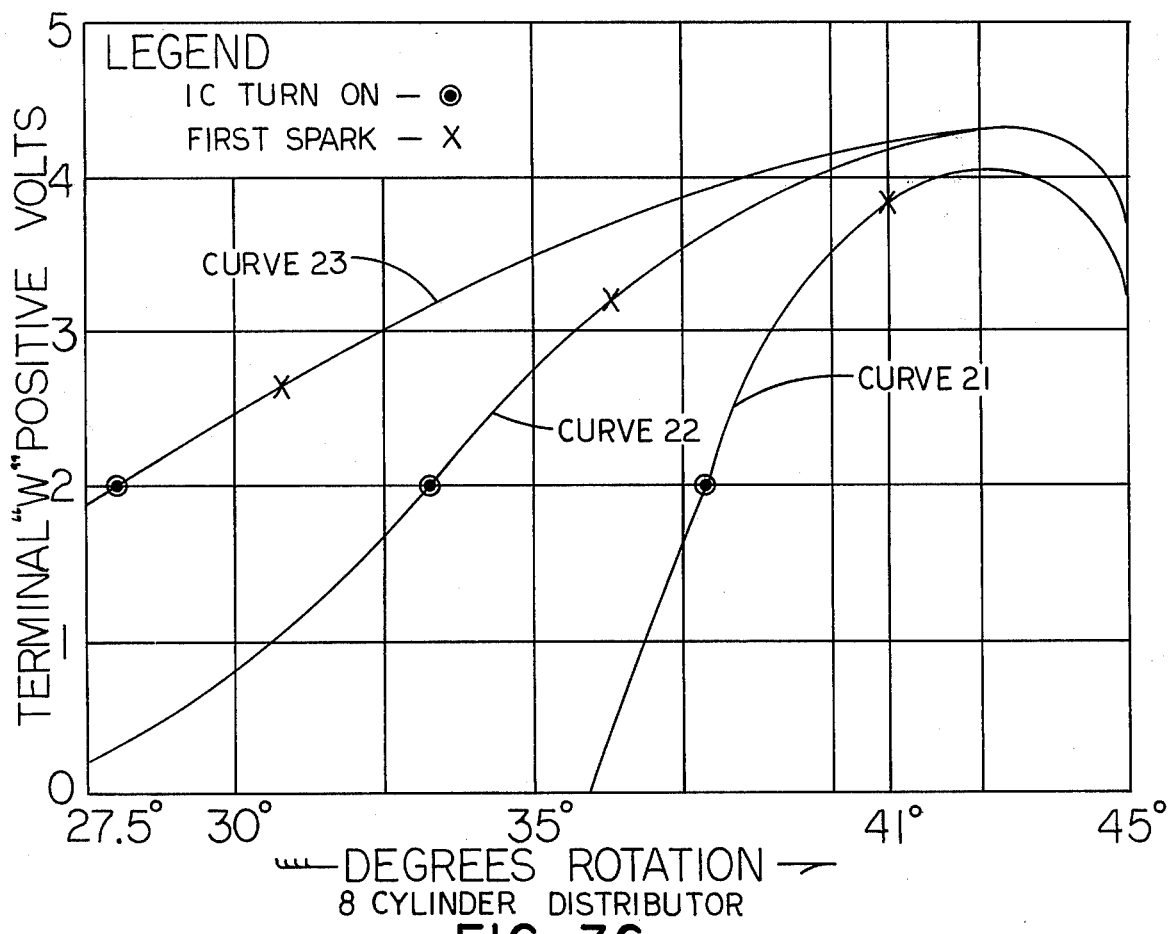
FIG. 3G shows graphically the positive voltage portion of the electrical pick-up of the system, as modified, and at 833 distributor RPM, together with the system turn on point and subsequent sparking points relative to distributor position for zero spark advance, a pre-selected wide open throttle spark advance and a pre-selected level road load spark advance.

FIG. 3G curve 22, shows graphically, at 838 distributor RPM, the relative effect obtained by connecting T9 and associated circuitry to terminal T of capacitor C4, has on the positive portion of the voltage between the junction of the voltage divider R21, R22 (terminal W) and ground, in relation to its not being connected, as shown on curve 21. The graph also shows that both the op-amp IC is turned "on" and transistor T1 is turned "off" 5° earlier in the rotation of distributor 6.

Figure 3H:
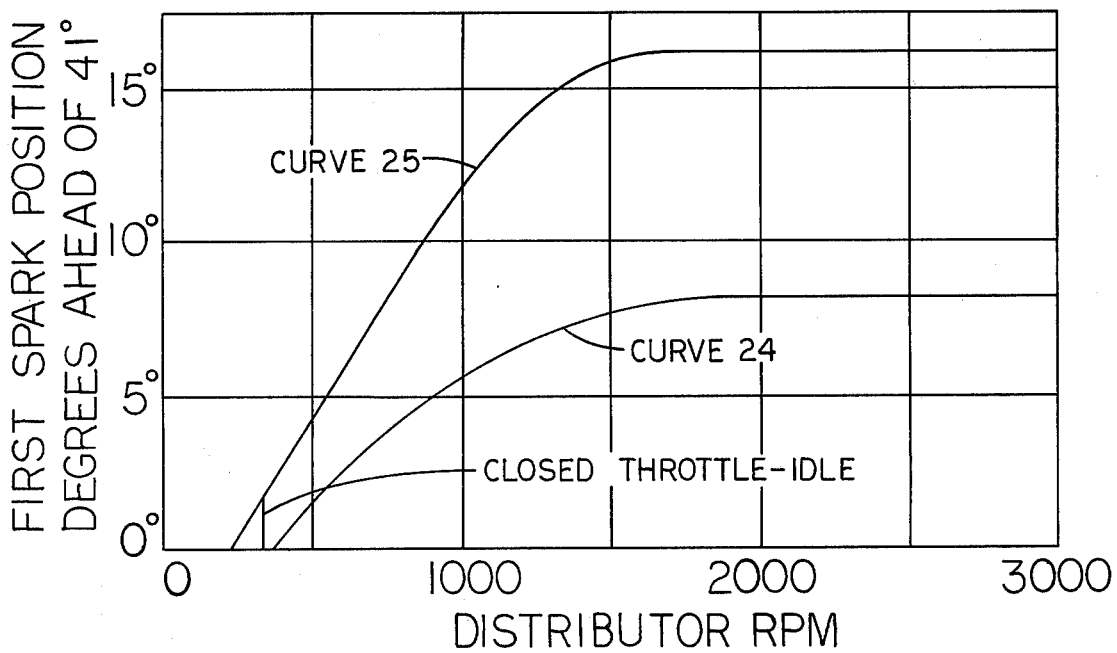
FIG. 3H shows graphically this pre-selected spark advance for both wide open throttle and level road load conditions, obtained by the particular modifications of the electrical pick-up voltage used, throughout the operating speed range.

FIG. 3H, curve 24, shows graphically, the "spark advance" ahead of 41° point, thru the operating speed range, in the position of distributor 6 rotation, obtained by connecting the components; pick-up coil U, diode bridge D1, diode series D2, capacitor C7, resistor R23 and transistor T9 in the circuit. This corresponds to the "advance" obtained in the present conventional distributor by the use of a centrifugal governor to rotate the reluctor or cam, as the case may be, in relation to the distributor drive shaft.

Refer now to the balance of portion L of the circuit. Shunt rehostat R24, (1 megohm) is connected from the positive terminal of diode D1, to the base of transistor T9, by conductors 33a and 33b. The resistance value of R24 is determined by the vacuum developed, by the engine, at a port in the carbuerator throat, which is on the atmospheric side of the throttle blade in the closed throttle position, but on the engine vacuum side as the throttle blade is slightly opened. This is similar to most automotive engines today. This part is connected to vacuum unit VI by tubing (not shown). Unit VI contains a diaphram and a return spring which urges contact arm 37 in a position to provide maximum resistance of rehostat R24. When vacuum is present, contact arm 37 is moved to reduce the resistance of R24, compressing the return spring (not shown). With a pre-selected value of vacuum, contact arm 37 will be moved against a stop (not shown) which will reduce the resistance value of R24 to 8 kilohm.

This permits more current to flow from the + terminal of diode D1 to the base of transistor T9, rendering it more conductive. In turn, this will further increase the positive voltage of terminal T of capacitor C4, causing op-amp IC to turn "on" still earlier in the rotation of distributor 6.

As the carbuerator throttle is opened more and more, the vacuum developed by the engine decreases, so that at some pre-selected combinations of throttle opening and engine RPM the vacuum will be reduced so that it will only partially actuate contact arm 37 of VI against the return spring, and so the resistance value of R24 will be varied accordingly from 8 kilohm to 1 megohm. At closed throttle, the vacuum applied to VI is zero and R24 is 1 megohm.

FIG. 3G, curve 23, also shows graphically, the positive portion of the voltage at terminal W relative to ground the "advance", at 833 distributor RPM, obtained by the addition of vacuum unit VI being actuated to reduce resister R24 to 8 kilohm. This graph shows that both op-amp IC is turned "on" and transistor T1 is turned "off" (first spark), 10° earlier in the rotation of distributor 6 than with zero spark "advance".

FIG. 3H, curve 25, shows graphically, the "advance", thru the operating speed range, in the position of distributor 6 rotation, ahead of the 41° position, obtained by the entire circuitry of circuit portion L. This corresponds to the "advance" obtained in the present conventional distributor by the combined use of a centrifugal governor and vacuum unit.

The specific components used in portion L of the circuit as shown, were preselected to reproduce the spark "advance" requirements of a Chrysler built 400 cubic inch, 2 barrel, automatic transmission engine. Other engines will require a different spark "advance", in which case, the components must be re-selected to produce the desired "advance".

C. DISTRIBUTOR AND ELECTRICAL PICK-UP COILS

Figure 4:
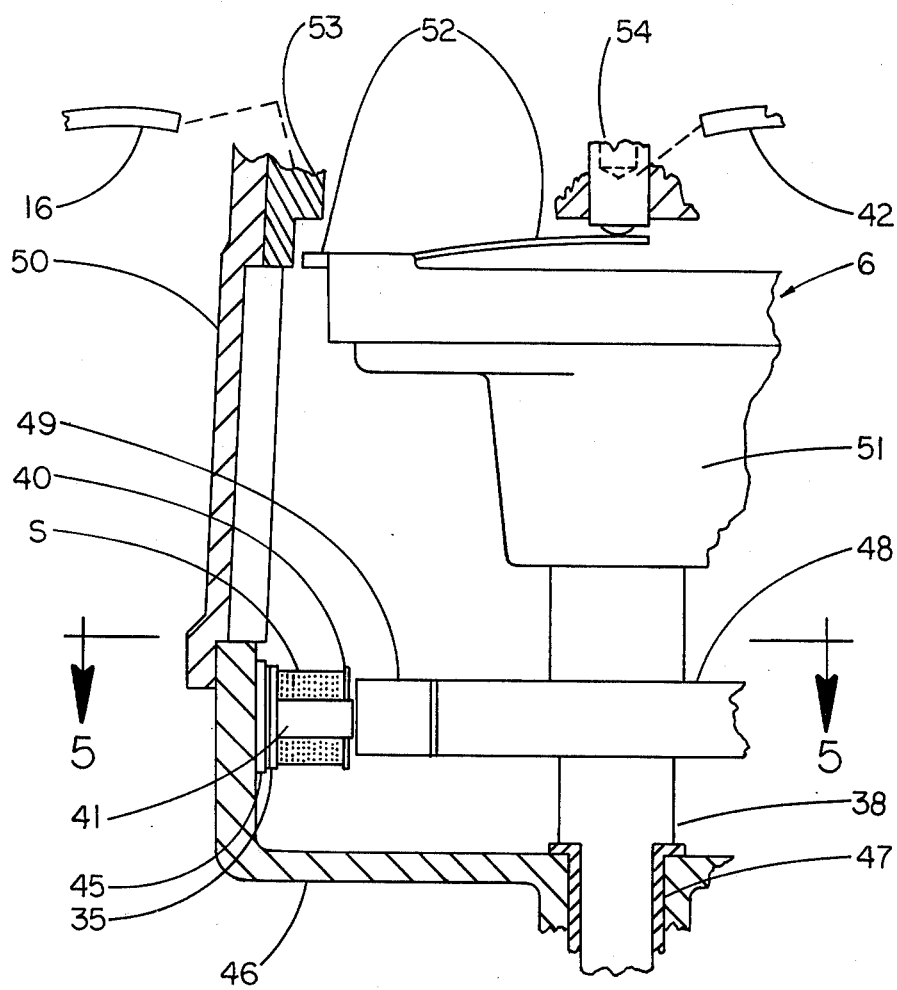
FIG. 4 shows a verticle section through the distributor used with the system.
Figure 5:
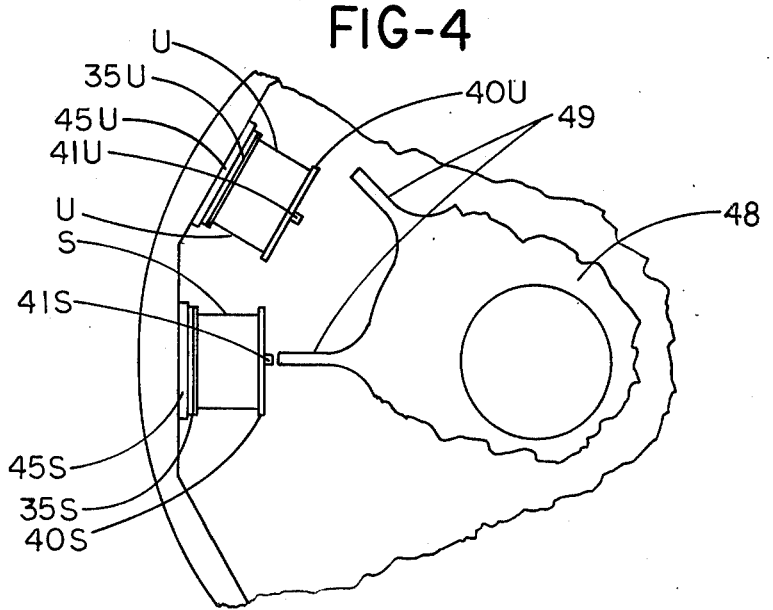
FIG. 5 shows a partial horizontal section through FIG. 4 along the line 5—5.

FIGS. 4 and 5 which is a sectional view in the direction 5 — 5 of FIG. 4, show distributor 6, including the pick-up coil S, used to trigger the system, and the pick-up coil U which provides a voltage responsive to the speed of rotation.

Pick-up coils S and U are wound with several hundred turns of small insulated copper wire on coil forms 40s and 40u, then assembled on magnetic cores 41s and 41u, which are in turn secured to magnetic base plates 35s and 35u. Permanent magnets 45s and 45u, magnetized to have their opposite magnetic pole faces adjacent the base plates 35s, 35u on one side and the magnetic distributor housing 46 on the other side are attached securely on both pole faces.

Distributor drive shaft 38 is rotated by the engine at ½ engine speed (driving means not shown) in bearing 47 secured in distributor housing 46, thus rotating reluctor 48 which is securely fastened to drive shaft 38. Reluctor 48 is of magnetic material and has 8 radially narrow arms 49 (in the case of an 8 cylinder engine) which pass close to the end of pick-up coil cores 41s, 41u when rotating. The resulting change in magnetic flux linking the pick-up coils S and U, as a reluctor arm approaches or leaves a pick-up coil 41, generates a voltage in the coils. Pick-up coil S is so connected in the circuit, that as a reluctor arm 49 moves away from direct alignment with pick-up coil core 41s, the voltage at terminal W, FIG. 2, of pick-up coil S is negative relative to terminal T, but as the next reluctor arm 49 approaches within 22.5°, or half way toward the pick-up coil core 41s, the voltage of terminal W becomes positive relative to the voltage at terminal T. This is shown clearly in graphic form in FIG. 3. Distributor 6 rotation point zero occurs when one reluctor arm 49 is in direct alignment with pick-up coil core 41s, and the rotation point 45° occurs when the next reluctor arm 49 lines up with the core 41s. The polarity of connections for pick-up coil U is unimportant since its output is rectified thru bridge rectifier D1, FIG. 2.

The distributor cap 50 and the rotor 51 are conventional in design. Rotor 51 is indexed to drive shaft 38 to insure that the rotor conductor 52 is in alignment with one of the spark plug cable 16 terminals 53 when the high voltage pulses are generated in ignition coil secondary winding SW and conducted to the center terminal 54 of distributor cap 50 by conductor 42.

Located also in the distributor housing 46 are the components, diodes D1, 2, 3, 4 capacitor C4 & C7 resistor R23 and transistor T9 (not shown). Conductors 31a, 31b and conductors 33a, 33b are connected to the proper components in housing 46, as shown in FIG. 2, circuit portion K and L.

Both pick-up coils S and U are shown in FIG. 5. Pick-up coils S and U are preferably not spaced the same number of degrees apart as the reluctor arms 49, so as to avoid mutual interference.

D. IGNITION COIL AND INTEGRAL COMPONENTS

Figure 6:
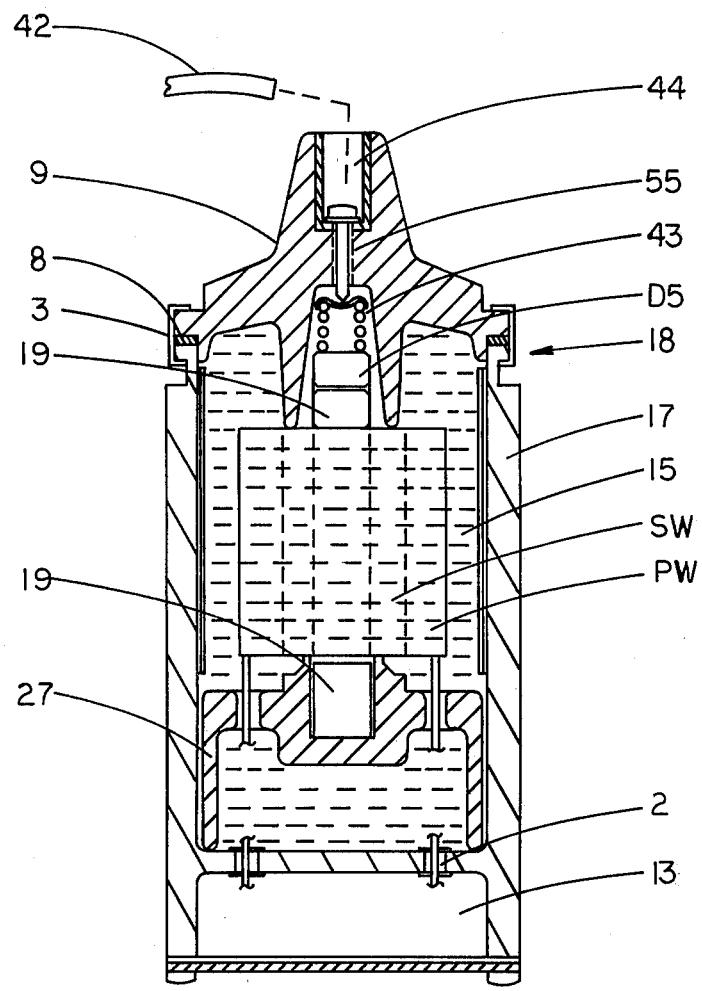
FIG. 6 shows a vertical section through the ignition coil used in the system.

Refer now to FIG. 6, ignition coil 18 has a housing 17 separated into oil filled compartment 15 and dry compartment 13. The oil filled compartment 15 is sealed to contain the oil within housing 17 by insulating tower 9, gasket 8, crimp ring 3 on one end and by seals 2 on the other end.

Contained in this oil filled compartment 15 are the magnetic core 19, of ferrite material, Indiana General type 0.5, TKD type H3S150 or equivalent, secondary winding SW, having about 17,500 turns of #40 B&S gauge insulated copper wire, primary winding PW having about 80 turns of #14 B&S gauge insulated copper wire. Mounted and electrically connected to the tower end of core 19 is diode D5. The inside turn of secondary winding SW is also connected to core 19. The other terminal of diode D5 is electrically connected via spring 43 to coil tower terminal 44 by screw 55. Insulating spacer 27 supports the core 19 and windings PW and SW and insulates the high voltage of winding SW from the balance of the circuit, as well as providing an oil filled portion that contains the components of circuit portion G, transistor T1 and resistors RE1 and RE2 of circuit portion E, FIG. 2.

Dry compartment 13 contains the components of circuit portions H and J of FIG. 2. Conductors 31a, 31b (not shown) connect the specified components to distributor 6, while conductor 20 (not shown) connects the coil primary winding PW directly to battery B, FIG. 2. Conductor 42 connects the tower terminal 44 to the distributor cap terminal 54.

E. OPERATION OF THE SYSTEM

Ignition switch 26 is closed and a current flow of about 15 milliamperes flows into the control circuit portions G, H, J and K via conductors 28, 29 and 30. There is no current flow to the ignition coil 18. The engine is cranked and an intermittent current flow is initiated by the pick-up coil S voltage to produce a series of high voltage pulses from ignition coil secondary winding SW, which result in 4 sparks occuring at each spark plug 1 in sequence, the initial spark being 4° of distributor rotation ahead of the time a reluctor arm 49 lines up with the pick-up coil core 41s.

The entire distributor was previously secured in the correct "timing" position to the engine to permit the first spark to occur at a pre-selected position of the piston in the cylinder.

When the engine starts, the idle speed is generally set at 300 to 350 distributor RPM when the engine is "warm", but may be some faster if the engine is "cold". The first spark will occur as shown in the graph of FIG. 3H for the specific idle speed. Four sparks will occur.

As the vehicle is driven, the first spark will occur as shown on the graph of FIG. 3H. The time of first spark will vary from curve 24 to curve 25 depending on engine vacuum. In general, when accelerating or having the throttle open appreciably, as at high speeds or climbing a grade, the first spark will occur according to curve 24, while at constant speed level road driving at normal speed, the first spark will occur according to curve 25.

F. SINGLE SPARK IGNITION

Although this invention, as described, has placed emphasis on the generation of a series of sparks for ignition, should a single spark be thought to be adequate, this can be accomplished with a corresponding further reduction in the consumption of energy, by reducing the "on time" of the "timer" of circuit portion H to just over 0.6 milliseconds

G. EXTRA MULTIPLE SPARKS CRANKING WITH SINGLE OR MULTIPLE SPARKS RUNNING

Figure 7:
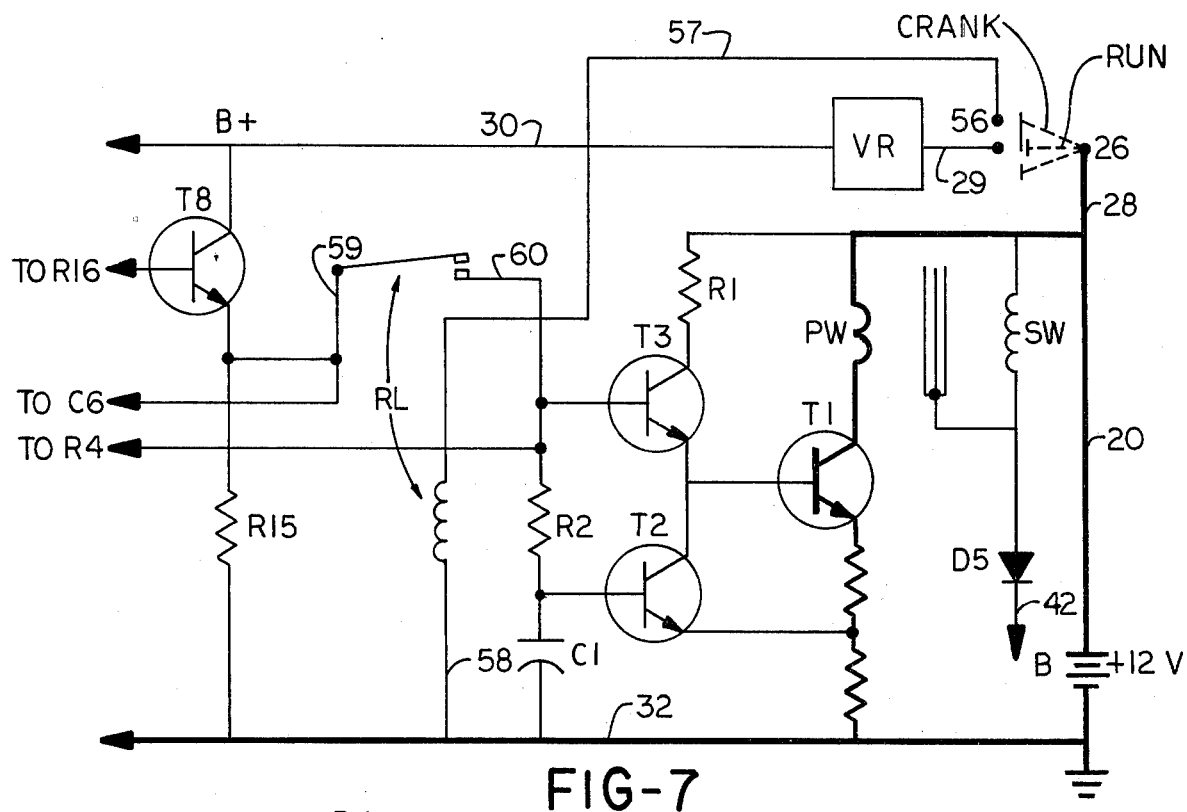
FIG. 7 shows schematically the circuit for obtaining a multitude of sparks while cranking and a pre-determined number of from one spark on up while running.

FIG. 7 shows a modification of the circuit of FIG. 2 that permits the production of many additional sparks while cranking. This is particularly advantageous since the poor mixtures generally occur when starting due to "hot" conditions, i.e. flooding, or "cold" conditions when the mixture may be either too rich or too lean.

Ignition switch 26 is modified as shown to add contact 56 and a starting position in which both conductor 29 and conductor 57 are connected to the battery. Conductor 57 is connected to the coil of normally open relay RL. The other end of the relay coil is connected to ground by conductor 58. When cranking, the relay contacts will close thus connecting the emitter of transistor T8 by conductors 59 and 60 directly to the base of transistor T3 and so bypassing the "timer" circuit as well as transistor T4.

This results in the positive voltage developed at the emitter of T8 being applied directly to the base of T3 and so T3 now remains in the "on" state as long as the positive voltage from pick-up coil S appears at the junction of voltage divider R21, R23.

A series of sparks will now be produced, while cranking, for 4° of distributor travel or from the 41° position to the 45° position. Thus there wll be 200 sparks produced when cranking at 10 distributor RPM and 40 sparks when cranking at 50 RPM.

With this circuit modification, the length of time the "timer" is "on" can also be reduced to just over 0.6 milliseconds and so only a single spark will occur when the engine is running, with a corresponding reduction in the consumption of energy.

H. ALTERNATE ELECTRONIC SPARK ADVANCE

It is well known that for maximum efficiency of operation of an internal combustion engine, that the time of ignition should be varied to compensate for differences in speed, load, mixture ratio and temperature, to insure the maximum possible pressure on the piston at the proper time. This variation in the time of ignition is necessary since the time from ignition to maximum combustion pressure varies with the above noted variables.

Today's method of changing this ignition point in time, relative to piston position, in relation to speed and engine vacuum is a compromise solution.

Figure 8:
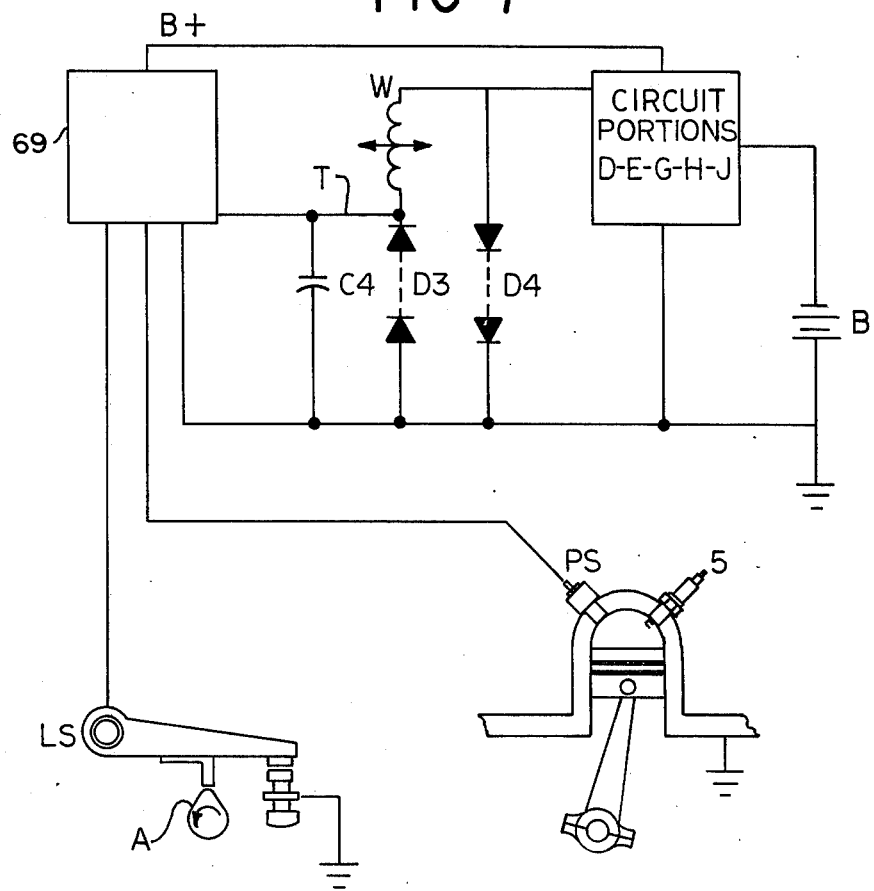
FIG. 8 is a schematic drawing of an alternate means of pre-determining electronically, the best point of igniting the mixture of an internal combustion engine, under all speed, load, mixture ratio and temperature variations, and electronically adjusting the spark to this point, relative to piston position in the cylinder.

Refer now to FIG. 8 which shows the means of igniting the mixture at the proper time to insure maximum utilization of the combustion pressure under all these variable conditions. Pressure transducer PS produces a voltage as a function of combustion pressure, the peak voltage of which is referenced to a pre-selected piston position near top dead center, signalled by location sensor LS and rotating cam A, which has been determined as the best piston position for maximum utilization of the combustion pressure. Should the peak combustion pressure deviate from this pre-selected piston position, an error voltage signal is generated, by error sensor 69, that either advances or retards the ignition point, to restore the peak pressure to the desired piston position.

CONCLUSION

Thus a multiple spark, or a single spark electronic ignition system has been shown and described having the advantages noted.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A multiple spark ignition system comprising, in combination:
   a crankshaft driven reluctor having a plurality of spaced arms extending radially outwardly from an axis,
   a first magnetic pickup coil having a core and a pair of terminals all mounted in magnetic association with said reluctor,
   a unidirectional voltage divider the resistance of which decreases with increasing applied voltage connected across the terminals of said first coil with its divider point connected to ground potential,
   a capacitor connected across one of said terminals of said first coil and ground, and
   an amplifier having an input terminal connected to the other of said terminals of said first coil,
   said amplifier producing an output pulse at a linearly earlier position of each arm of said reluctor in relationship to said core as operating speeds of an associated internal combustion engine increases so that an essentially fixed time interval exists from the time said amplifier produces an output pulse until each said reluctor arm reaches a constant position relative to said core.

2. The multiple spark ignition system set forth in claim 1 in further combination with:
   a second magnetic pickup coil having a pair of terminals connected across a bridge rectifier to produce a DC voltage proportional to crankshaft speed of said engine,
   said second coil being magnetically associated with said reluctor,
   means associated with said bridge rectifier to amplify its output voltage signal and apply the resultant voltage between said first coil capacitor junction and ground to change the relationship of the output voltage of said first coil relative to ground and thus to affect the relationship of an arm of said reluctor to said core at the instant an output signal is obtained from said amplifier.

3. The multiple spark ignition system set forth in claim 2 in further combination with:
   additional means for modifying the output voltage of said second coil to affect the output voltage of said first coil relative to ground and thus to further affect the position of an arm of said reluctor relative to said core of said first coil at the time said amplifier is energized.

4. The multiple spark ignition system set forth in claim 1 in further combination with:
   a timer actuated by said amplifier for limiting the duration of time an associated switching means may be operative,
   an associated switching transistor means for causing intermittent current flow through said primary winding of said ignition coil in response to flux conditions in said ignition coil core during the time said timer is activated,
   an ignition coil having a core of magnetic material capable of relatively high flux densities and a relatively low retention factor,
   a primary winding of relatively few turns mounted on said core,
   a secondary winding having relatively many turns wound on said core, and
   said secondary winding of said ignition coil producing a high voltage pulse each time said switching transistor means is rendered non-conductive.

5. The multiple spark ignition system set forth in claim 4 wherein:
   said switching transistor means causes intermittent current flow in response to saturation conditions of said core of said ignition coil.

6. The multiple spark ignition system set forth in claim 4 in further combination with:
   a diode connected in series with the output of said secondary winding to block any flow of current when current flows in said primary winding.

7. The multiple spark ignition system set forth in claim 4 wherein:
   said timer is adjusted to limit its "on" time to permit only one pulse from said secondary winding.

8. The multiple spark ignition system set forth in claim 4 in further combination with:
   means for rendering said timer ineffective when said engine is being cranked.

9. An inductive ignition system for an internal combustion engine comprising:
- an ignition coil having a core of magnetic material capable of relatively high flux densities and a relatively low retention factor,
- a primary winding of relatively few turns mounted on said core,
- a secondary winding having relatively many turns wound on said core,
- means for initiating current flow in said primary winding a predetermined and essentially constant time intervale, at all rotation speeds of an associated reluctor, in advance of subsequent interruption of said current flow,
- said time interval being of sufficient duration to result in magnetically saturating said core, and
- means for preselecting the instant of initiating said current flow in relationship to the position of a piston of the engine in its cylinder at a linearly earlier position as operating speeds of the engine increase.

10. The inductive ignition system set forth in claim 9 in further combination with:
- means for subsequently re-establishing current flow in said primary winding following the first sequence of current flow and interruption of sufficient duration to magnetically saturate said core, and
- means for controlling the subsequent number of sequences of current flow and interruptions for each power stroke of the engine.

11. The inductive ignition system set forth in claim 9 in further combination with:
- a normally non-conductive transistor means connecting said primary winding to a source of battery power at all times whether the associated engine is in use or not.

12. The inductive ignition system set forth in claim 11 wherein:
- said transistor means comprises a first transistor connected to a battery source and a second transistor having a control element connected to a base of said first transistor,
- said second transistor having a base connected to an RC circuit wherein activation of the RC circuit results in conduction and non-conduction of said first transistor at preselected time intervals.

13. A multiple spark ignition system comprising, in combination:
- a crankshaft-driven reluctor having a plurality of spaced arms extending radially outwardly from an axis,
- a first magnetic pickup coil having a core and a pair of terminals all mounted in magnetic association with said reluctor,
- a unidirectional voltage divider the resistance of which decreases with increasing applied voltage connected across the terminals of said first coil with its divider point connected to ground potential,
- a capacitor connected across one of said terminals of said first coil and ground,
- an amplifier having an input terminal connected to the other of said terminals of said first coil,
- said amplifier producing an output signal at essentially a predetermined position of each arm of said reluctor in relationship to the core of said first coil at all operating speeds of an associated internal combustion engine,
- an error sensor,
- said sensor comprising a pressure transducer responsive to cylinder pressure of the associated engine,
- a position sensor for the piston of the associated engine, and
- means to measure the peak explosion pressure relative to piston position,
- said means correcting any error in the location of a position of a corresponding arm of said reluctor with relationship to the first pickup coil to affect ignition of the gas mixture in the cylinder of the associated engine so that subsequent peak explosion pressure occurs at a constant position of a piston in its cylinder of the associated engine at all engine operating conditions.

* * * * *